United States Patent
Kawalkar et al.

(10) Patent No.: US 9,646,503 B2
(45) Date of Patent: May 9, 2017

(54) COCKPIT DISPLAY SYSTEMS AND METHODS FOR GENERATING NAVIGATION DISPLAYS INCLUDING LANDING DIVERSION SYMBOLOGY

(71) Applicant: HONEYWELL INTERNATIONAL INC., Morristown, NJ (US)

(72) Inventors: Amit Nishikant Kawalkar, Karnataka (IN); Rajesh Chaubey, Karnataka (IN); Rajeev Mohan, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 74 days.

(21) Appl. No.: 14/619,849

(22) Filed: Feb. 11, 2015

(65) Prior Publication Data
US 2016/0229554 A1    Aug. 11, 2016

(51) Int. Cl.
*G08G 5/00* (2006.01)
*G01C 23/00* (2006.01)
*G08G 5/02* (2006.01)

(52) U.S. Cl.
CPC ........... *G08G 5/0056* (2013.01); *G01C 23/00* (2013.01); *G01C 23/005* (2013.01); *G08G 5/0021* (2013.01); *G08G 5/025* (2013.01); *G08G 5/00* (2013.01); *G08G 5/0039* (2013.01)

(58) Field of Classification Search
None
See application file for complete search history.

(56) References Cited

U.S. PATENT DOCUMENTS

| 6,154,151 A | 11/2000 | McElreath et al. |
| 6,163,744 A | 12/2000 | Onken et al. |
| 6,505,102 B2 * | 1/2003 | Morizet ................. G01C 23/00 701/18 |

(Continued)

FOREIGN PATENT DOCUMENTS

| EP | 2163849 A2 | 3/2010 |
| EP | 2790168 A2 | 10/2014 |

(Continued)

OTHER PUBLICATIONS

Kuffer, M., et al. "Human Factors Assessment of Runway Status Lights and Final Approach Runway Occupancy Signal," MIT, Air Line Pilots Association, 2012.

(Continued)

*Primary Examiner* — Thomas G Black
*Assistant Examiner* — Demetra Smith-Stewart
(74) *Attorney, Agent, or Firm* — Lorenz & Kopf, LLP

(57) ABSTRACT

Cockpit display systems and methods for generating navigation displays including landing diversion symbology are provided. In one embodiment, the cockpit display system includes a cockpit monitor and a controller coupled to the cockpit monitor. The controller is configured to assess the current feasibility of landing at one or more diversion airports in a range of an aircraft on which the cockpit display system is deployed. The controller is further configured to assign each diversion airport to one of a plurality of predetermined landing feasibility categories, and generate a horizontal navigation display on the cockpit monitor including symbology representative of the feasibility category assigned to one or more of the diversion airports.

16 Claims, 12 Drawing Sheets

(56) References Cited

U.S. PATENT DOCUMENTS

| | | | |
|---|---|---|---|
| 7,436,323 | B2 | 10/2008 | Ishihara et al. |
| 7,693,621 | B1 | 4/2010 | Chamas |
| 8,014,907 | B2 | 9/2011 | Coulmeau |
| 8,126,599 | B2 | 2/2012 | Coulmeau et al. |
| 8,195,347 | B2 | 6/2012 | Boorman |
| 8,321,069 | B2 | 11/2012 | Vasek et al. |
| 8,527,871 | B2 | 9/2013 | Holder et al. |
| 8,560,150 | B1 | 10/2013 | Phillips et al. |
| 8,565,944 | B1* | 10/2013 | Gershzohn ............ G08G 5/0039 701/1 |
| 8,660,716 | B1 | 2/2014 | Rahmes et al. |
| 8,676,481 | B2* | 3/2014 | Coulmeau ............ G08G 5/0021 701/122 |
| 8,977,484 | B1* | 3/2015 | La Civita ............ G08G 5/0026 340/945 |
| 9,126,694 | B2* | 9/2015 | Chandrashekarappa .................... B64D 43/00 |
| 2009/0043434 | A1 | 2/2009 | Deker |
| 2011/0137495 | A1 | 6/2011 | Sacle et al. |
| 2011/0208374 | A1* | 8/2011 | Jayathirtha ............ G05D 1/0676 701/5 |
| 2011/0301842 | A1* | 12/2011 | Krupansky ............ G01C 23/00 701/411 |
| 2012/0215386 | A1* | 8/2012 | Louise ............ G01C 23/00 701/3 |
| 2013/0245860 | A1 | 9/2013 | Cooper |
| 2014/0039731 | A1 | 2/2014 | Leberquer et al. |
| 2014/0129058 | A1 | 5/2014 | Elahi et al. |
| 2014/0309821 | A1 | 10/2014 | Poux et al. |
| 2014/0343765 | A1* | 11/2014 | Suiter ............ G08G 5/0056 701/18 |
| 2015/0123912 | A1* | 5/2015 | Nikolic ............ G01C 23/00 345/173 |

FOREIGN PATENT DOCUMENTS

| | | |
|---|---|---|
| WO | 2008130948 A1 | 10/2008 |
| WO | 2013053395 A1 | 4/2013 |

OTHER PUBLICATIONS

Subbotin, N., et al. "Takeoff and Landing Performance Assessment Validation Effort of the Runway Condition Assessment Matrix," U.S. Department of Transportation Federal Aviation Administration, 2013.

Koyuncu, E., et al. "Design of a pilot-centered visual decision-support system for airborne collision avoidance," Controls & Avionics Lab, 2013.

Rong, J., et al.. "Small Aircraft Pilot Assistant: Onboard Decision Support System for SATS Aircraft" Texas A & M University, 2005.

EP Extended Search Report for Application 16154358.2-1557 dated Jun. 29, 2016.

* cited by examiner

| LANDING FEASIBILITY CATEGORY | EXEMPLARY ICON (WITH CROSS-HATCHING) | COLOR CODE (CORRESPONDING TO CROSS-HATCHING) |
|---|---|---|
| HIGH FEASIBILITY | | GREEN |
| MODERATE FEASIBILITY | | AMBER |
| LOW/NO FEASIBILITY | | RED |

FIG. 3

COCKPIT DISPLAY SYSTEMS AND METHODS FOR GENERATING NAVIGATION DISPLAYS INCLUDING LANDING DIVERSION SYMBOLOGY

TECHNICAL FIELD

The following disclosure relates generally to cockpit display systems and, more particularly, to cockpit display systems and methods for generating navigation displays including landing diversion symbology, which aids pilot decision-making under landing diversion conditions.

BACKGROUND

Approach and landing are often the most demanding and dynamic phases of flight. Although these flight phases can be highly automated in many instances, sudden changes in approach or landing parameters can result in an abrupt transition to a state of little to no automation. In such an instance, a pilot may be required to rapidly assess the possibility of diverting from the planned route and landing at an alternative airport (referred to herein as a "diversion airport"). Factors that may warrant a landing diversion can include a change in the designated runway or airport due to, for example, an on-ground emergency situation, a passenger emergency situation, or an airport closure; a change in landing minimums due to adverse weather conditions; a reduction in aircraft stopping performance due to an engine failure, reverse thrust unavailability, or speed break failure; and a decrease in useable runway length due to the presence of ice or debris on the runway surface. After determining that a landing deviation is appropriate and identifying a feasible diversion option, the pilot requests clearance to perform the landing deviation from a ground controller. If clearance is granted, the pilot then executes the landing deviation without undue delay. Even after executing the diversion, however, the pilot and other flight crew members may still be required to monitor for any further changes in the condition or conditions necessitating the diversion. A considerable workload is consequently placed on the pilot and flight crew to continually monitor flight parameters and assess safety considerations under landing diversion conditions.

It is thus desirable to provide cockpit display systems, which facilitate pilot decision-making and safety assessments when considering diverting from a planned landing. Ideally, such a cockpit display system would provide the pilot with an intuitive graphical indication of diversion airports at which the aircraft could feasibly land to reduce the workload placed on the pilot and the aircrew under dynamically-changing diversion conditions. It would also be desirable if such a cockpit display system could facilitate communications between a pilot and a ground controller when negotiating a possible landing deviation. Other desirable features and characteristics of the present invention will become apparent from the subsequent Detailed Description and the appended Claims, taken in conjunction with the accompanying Drawings and the foregoing Background.

BRIEF SUMMARY

Cockpit display systems are provided for generating navigation displays including landing diversion symbology, which aid pilot decision making under landing diversion conditions. In one embodiment, the cockpit display system includes a cockpit monitor and a controller coupled to the cockpit monitor. The controller is configured to assess the current feasibility of landing at one or more diversion airports in a vicinity or range of an aircraft on which the cockpit display system is deployed. The controller is further configured to assign each diversion airport to one of a plurality of predetermined landing feasibility categories, and generate a horizontal navigation display on the cockpit monitor including symbology representative of the feasibility category assigned to one or more of the diversion airports.

In a further embodiment, a cockpit display system is provided for deployment onboard an aircraft. The cockpit display system includes a cockpit monitor and a controller coupled to the cockpit display system. The controller is configured to assess the current feasibility of landing at a first landing option, such as a designated airport or a diversion airport, in range of the aircraft. The controller further assigns the first landing option to one of a plurality of predetermined landing feasibility categories and then generates a navigation display, such as a horizontal or a vertical navigation display, on the cockpit monitor including symbology representative of the feasibility category assigned to the first landing option.

Further provided are methods carried-out by the cockpit display system of an aircraft in generating navigation displays including landing diversion symbology. The cockpit display system includes a controller and a cockpit monitor operably coupled to the controller. In one embodiment, the method includes the steps or processes of: (i) at the controller, assessing the current feasibility of landing at one or more diversion airports in a range of the aircraft; (ii) at the controller, assigning each diversion airport to one of a plurality of predetermined landing feasibility categories; and (iii) at the display, generating a navigation display on the cockpit monitor including symbology representative of the feasibility category assigned to one or more of the diversion airports.

BRIEF DESCRIPTION OF THE DRAWINGS

At least one example of the present invention will hereinafter be described in conjunction with the following figures, wherein like numerals denote like elements, and:

FIG. 3 is a table setting-forth a number of landing feasibility categories to which the cockpit display system shown in FIG. 1 can assign diversion and designated airports, as well as corresponding cross-hatched and color coded symbology, as illustrated in accordance with an exemplary and non-limiting embodiment of the present invention;

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description. Terms such as "comprise," "include," "have," and variations thereof are utilized herein to denote non-exclusive inclusions. Such terms may thus be utilized in describing processes, articles, apparatuses, and the like that include one or more named steps or elements, but may further include additional unnamed steps or elements.

Figure 1:
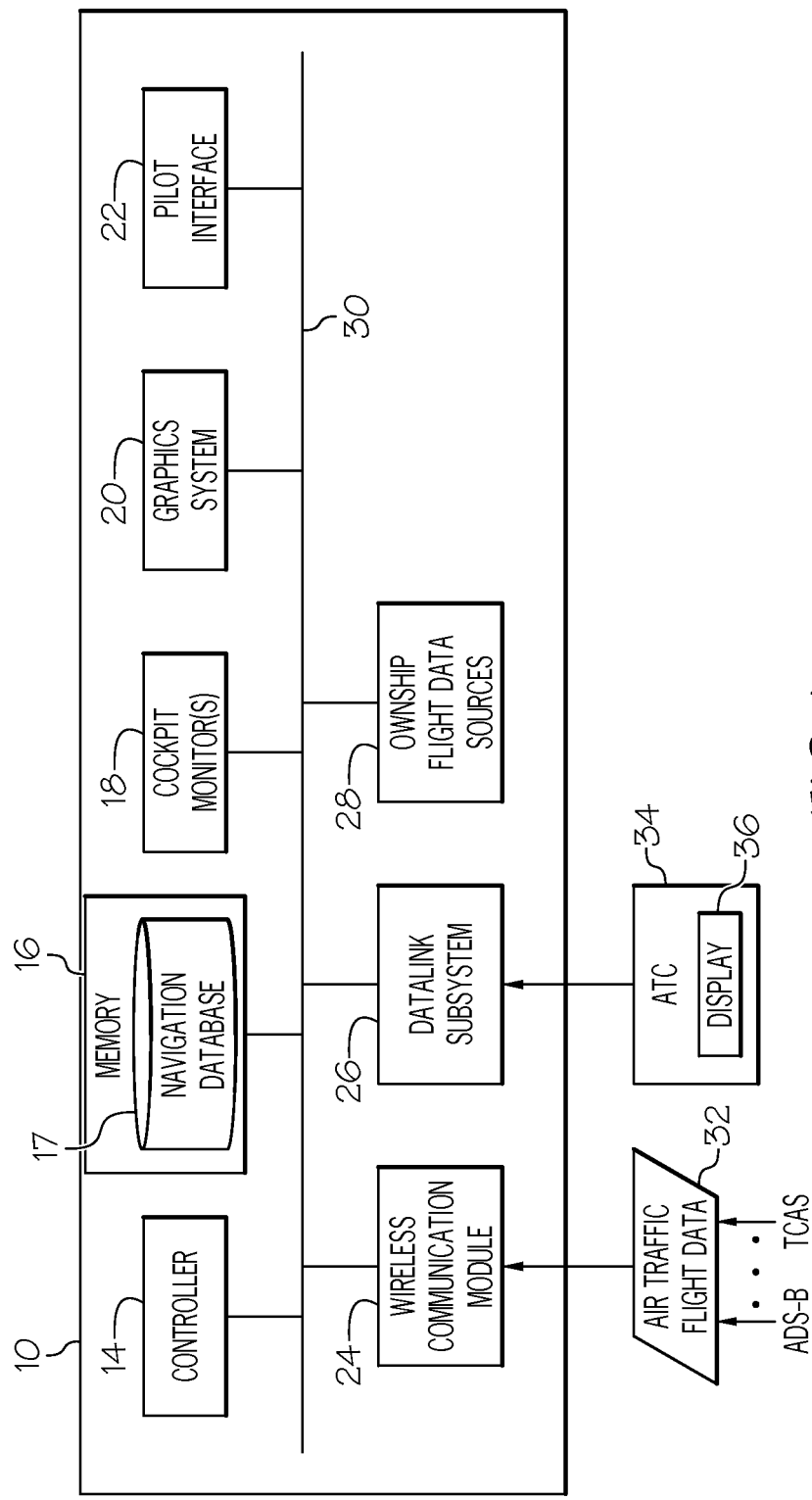
FIG. 1 is a block diagram of a cockpit display system deployed onboard an aircraft and illustrated in accordance with an exemplary and non-limiting embodiment of the present invention.

FIG. 1 sets-forth a block diagram of a cockpit display system 10 suitable for generating one or more navigation displays including landing diversion symbology, which aid pilot decision-making when considering diverting from a planned route during approach and landing. The term "display," as appearing herein, refers to an image produced on the screen of an image-generating device or "monitor." A given navigation display can occupy the entire screen of a monitor or, perhaps, a limited portion thereof. In preferred embodiments, cockpit display system 10 generates a first navigation display from a top-down or planform point of view. This type of display may be referred to as a "moving map display" and is referred to herein as a "horizontal navigation display." Examples of horizontal navigation displays or "HNAV displays" that can be generated during operation of system 10 are described below in conjunction with FIGS. 4-6. Additionally or alternatively, cockpit display system 10 may further generate a second navigation display from a side or lateral viewpoint. This type of display is referred to herein as a "vertical navigation display." Examples of vertical navigation displays or "VNAV displays" that may be generated during operation of system 10 are described below in conjunction with FIGS. 7-11. Finally, the aircraft carrying cockpit display system 10 is referred to herein as the "ownship aircraft."

With reference to FIG. 1, cockpit display system 10 includes the following components, many or all of which may be comprised of multiple devices, systems, or elements: a controller 14; memory 16 including a navigation database 17; one or more cockpit monitors 18; a graphics system 20; a pilot interface 22; a wireless communication module 24; a data link subsystem 26; and one or more sources of flight status data pertaining to the aircraft (referred to herein as "ownship flight data sources 28"). The elements of cockpit display system 10 are operatively coupled together by an interconnection architecture 30 enabling the transmission of data, command signals, and operating power within cockpit display system 10. In practice, cockpit display system 10 and the ownship aircraft will typically include various other devices and components for providing additional functions and features, which are not shown in FIG. 1 and will not be described herein to avoid unnecessarily obscuring the invention. Although cockpit display system 10 is schematically illustrated in FIG. 1 as a single unit, the individual elements and components of cockpit display system 10 can be implemented in a distributed manner using any number of physically-distinct and operatively-interconnected pieces of hardware or equipment.

Controller 14 may comprise, or be associated with, any suitable number of additional conventional electronic components including, but not limited to, various combinations of microprocessors, flight control computers, navigational equipment, memories, power supplies, storage devices, interface cards, and other standard components known in the art. Furthermore, controller 14 may include, or cooperate with, any number of software programs (e.g., avionics display programs) or instructions designed to carry-out the various methods, process tasks, calculations, and control/display functions described below. As described in more detail below, controller 14 obtains and processes current data indicative of the feasibility of landing at designated and diversion airports to determine the appropriate diversion symbology to include in the navigation display(s) rendered on cockpit monitor(s) 18.

Memory 16 may be realized as Random Access ("RAM") memory, flash memory, Erasable Programmable Read Only Memory ("EPROM") memory, Electronically Erasable Programmable Read Only Memory ("EEPROM") memory, registers, a hard disk, a removable disk, a Compact Disc Read Only Memory ("CD-ROM"), or any other form of storage medium known in the art. In this regard, memory 16 can be coupled to controller 14 such that controller 14 can read information from, and write information to, memory 16. Alternatively, memory 16 may be integral to controller 14. As an example, controller 14 and memory 16 may reside in an Application Specific Integrated Circuit ("ASIC"). In practice, a functional or logical module/component of cockpit display system 10 might be realized using program code maintained in memory 16. For example, graphics system 20, wireless communication module 24, or the datalink subsystem 26 may have associated software program components that are stored in memory 16. Moreover, memory 16 can store data utilized to support the operation of cockpit display system 10, as will become apparent from the following description. Navigation database 17, specifically, stores information relating to airports and runways, such as runway locations and lengths. In one embodiment, navigation database 17 includes or assumes the form of an Enhanced Ground Proximity Warning System ("EGPWS") runway database.

In an exemplary embodiment, cockpit monitor(s) 18 are coupled to graphics system 20. Controller 14 and graphics system 20 cooperate to display, render, or otherwise convey one or more graphical representations, synthetic displays, graphical icons, visual symbology, or images associated with operation of the ownship aircraft on cockpit monitor(s) 18, as described in greater detail below. An embodiment of cockpit display system 10 may utilize existing graphics processing techniques and technologies in conjunction with graphics system 20. For example, graphics system 20 may be suitably configured to support well known graphics technologies such as, without limitation, Video Graphics Array ("VGA"), super VGA, and ultra VGA technologies. Cockpit monitor(s) 18 may comprise any image-generating device or devices capable of producing one or more navigation displays of the type described below. A non-exhaustive list of display devices suitable for use as cockpit monitor(s) 18 includes cathode ray tube, liquid crystal, active matrix, and plasma display devices. As a point of emphasis, the term "cockpit monitor" encompasses monitors (image-generating devices) fixed to the aircraft cockpit, as well as Electronic Flight Bags ("EFBs") and other portable monitors that may be carried by a pilot or other flight crew member into the cockpit of an aircraft and perform the below-described functions.

Pilot interface 22 is suitably configured to receive input from a pilot or other crew member; and, in response thereto, to supply appropriate command signals to controller 14. Pilot interface 22 may be any one, or any combination, of various known pilot interface devices or technologies including, but not limited to: a touchscreen, a cursor control device such as a mouse, a trackball, or joystick; a keyboard; buttons; switches; or knobs. Moreover, pilot interface 22 may cooperate with cockpit monitor(s) 18 and graphics system 20 to provide a graphical pilot interface. Thus, a crew member can manipulate pilot interface 22 by moving a cursor symbol rendered on cockpit monitor(s) 18, and the user may use a keyboard to, among other things, input textual data. For example, the crew member could manipulate pilot interface 22 to enter a desired or requested new flight level into cockpit display system 10.

In an exemplary embodiment, wireless communication module 24 is suitably configured to support data communication between the ownship aircraft and one or more remote systems. More specifically, wireless communication module 24 allows reception of current air traffic data 32 of other aircraft within the proximity of the ownship aircraft. In particular embodiments, wireless communication module 24 is implemented as an aircraft-to-aircraft wireless communication module, which may include an S-mode transponder, that receives flight status data from an aircraft other than the ownship aircraft. For example, wireless communication module 24 may be configured for compatibility with Automatic Dependent Surveillance Broadcast ("ADS-B") technology, with Traffic and Collision Avoidance System ("TCAS") technology, and/or with similar technologies. Air traffic data 32 may include, without limitation: airspeed data; fuel consumption; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; and the like.

Datalink subsystem 26 enables wireless bi-directional communication between the ownship aircraft and an Air Traffic Controller "(ATC)" system 34, which includes an ATC display 36. As appearing herein, the term "Air Traffic Controller" and the corresponding acronym "ATC" refers to any recognized authority in controlling air traffic that is external to the aircraft carrying cockpit display system 10. Datalink subsystem 26 may be used to provide ATC data to the ownship aircraft and/or to send information from the ownship aircraft to ATC in compliance with known standards and specifications. Using datalink subsystem 26, the ownship aircraft can send diversion requests along with other data to a ground-based ATC stations. In turn, the ownship aircraft can receive diversion clearance or authorization from ATC, as appropriate, such that the pilot can initiate the requested diversion in landing route, as described more fully below in conjunction with FIG. 12.

With continued reference to FIG. 1, the sources of ownship flight data 28 generate, measure, and/or provide different types of data related to the operational status of the ownship aircraft, the environment in which the ownship aircraft is operating, flight parameters, and the like. The sources of ownship flight data 28 may also be other systems, which, for the intent of this document, may be considered to be included within cockpit display system 10. Such systems may include, but are not limited to, a Flight Management System ("FMS"), an Inertial Reference System ("IRS"), and/or an Attitude Heading Reference System ("AHRS"). Data provided by the sources of ownship flight data 28 may include, without limitation: airspeed data; groundspeed data; altitude data; attitude data including pitch data and roll data; yaw data; geographic position data, such as Global Positioning System ("GPS") data; time/date information; heading information; weather information; flight path data; track data; radar altitude; geometric altitude data; wind speed data; wind direction data; fuel consumption; etc. Cockpit display system 10 is suitably designed to process data obtained from the sources of ownship flight data 28 in the manner described in more detail herein. In particular, cockpit display system 10 can utilize flight status data of the ownship aircraft when rendering the navigation displays described below in conjunction with FIGS. 4-11.

Figure 2:
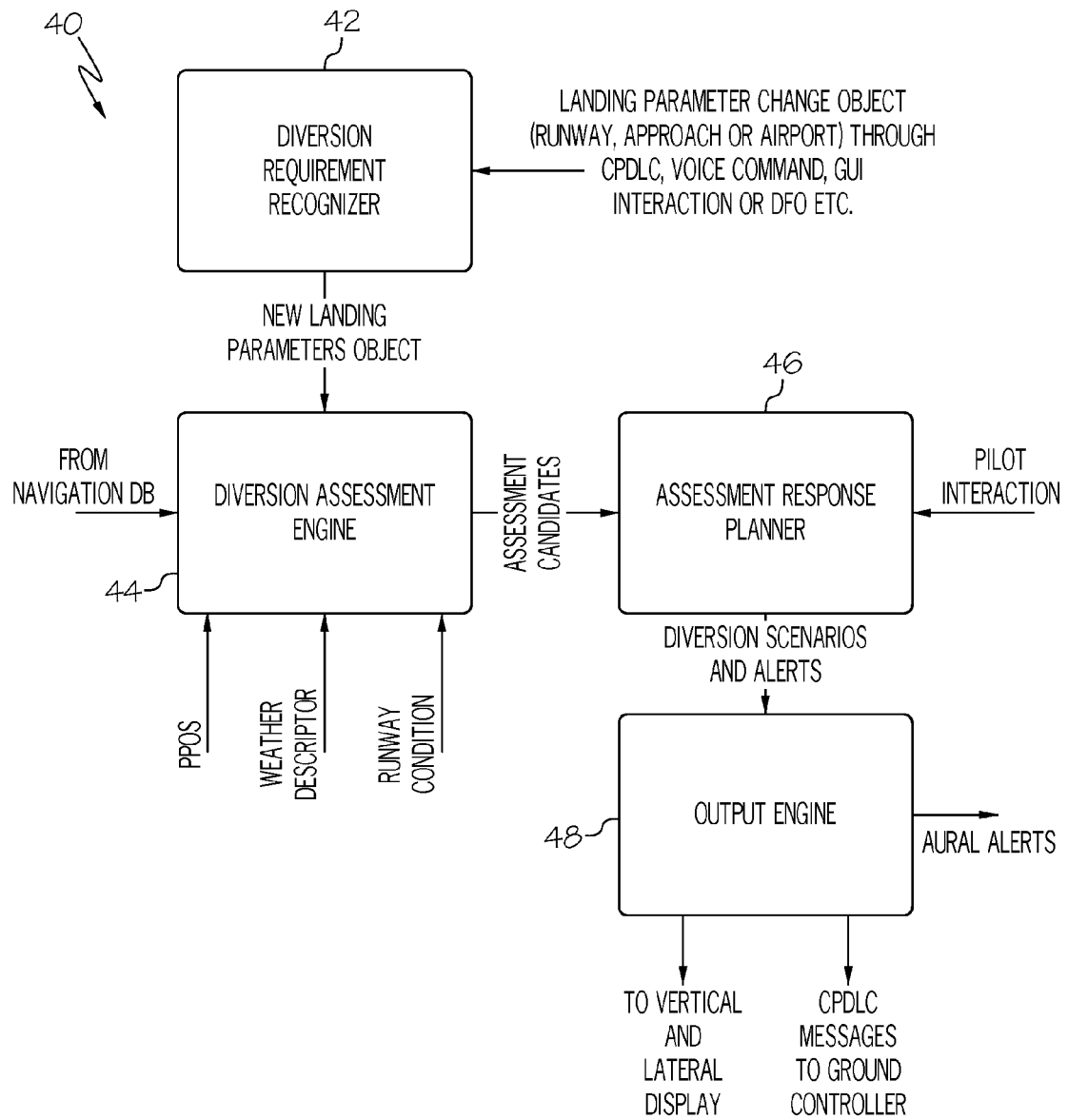
FIG. 2 is a block diagram schematically illustrating an exemplary control architecture that can be implemented via the controller of the cockpit display system shown in FIG. 1.

FIG. 2 is a block diaphragm schematically illustrating an exemplary control architecture 40 that can be implemented via controller 14 of cockpit display system 10 (FIG. 1). Control architecture 40 is divided into several modules or components, which can be implemented utilizing any combination of hardware, software, firmware, and the like. Control architecture 40 includes a diversion evaluation recognizer 42, a diversion assessment engine 44, an assessment response planner 46, and an output engine 48. During operation of cockpit display system 10, diversion evaluation recognizer 42 monitors for an input signal indicating that an assessment of diversion options is desired or appropriate. As indicated in FIG. 2, this signal may be received as a landing parameter change, such as a change in runway, a change in airport, or a change in approach parameters. Alternatively, data may be received via Controller-Pilot Data Link Communications (CPDLCs), as occurring over datalink subsystem 26 (FIG. 1), commanding performance of a landing diversion assessment. As a still further possibility, recognizer 42 can establish the desirability of generating diversion symbology on the navigation display(s) in response to a pilot request. In this case, the request may contain descriptive objects, such as one or more of an airport, runway, or approach path. Alternatively, the request may be received as a signal indicating need to perform diversion task from either from a pilot or a Digital First Officer (DFO). When determining that a diversion assessment is warranted, recognizer 42 sends a corresponding request to diversion assessment engine 44.

In response to receipt of a diversion assessment request from recognizer 42, diversion assessment engine 44 carries-out a landing diversion assessment. Engine 44 performs the landing diversion assessment by evaluating the feasibility of landing options in range of the aircraft. The current range of the aircraft can be determined in a conventionally-known manner based on weather conditions, the weight of the aircraft, presently remaining fuel, and other such parameters provided by ownship flight data sources 28 (FIG. 1). The landing options available to the aircraft can include the airport at which the aircraft is currently scheduled to land (referred to herein as the "designated airport") and any diversion airports in range of the aircraft. Factors that can be considered by diversion assessment engine 44 during this assessment include, but are not limited to, current weather conditions, current runway conditions, aircraft's current energy state, present aircraft position ("PPOS"), aircraft flight plan, drag component availability and deployment schemes, and automation and pilot's coordination possibilities. In certain implementations, the landing diversion assessment can be implemented utilizing existing data communication, such as digital Notice to Airman ("NOTAM"), digital Automatic Terminal Information Service ("ATIS"), weather data sources (e.g., XM weather), and automation infrastructure. Engine 44 can utilize a pre-established lookup table or algorithm to assign each landing option (e.g., the designated airport and the in-range diversion airports) to one of a plurality predetermined landing feasibility categories. Furthermore, diversion assessment engine 44 can also consider the pilot workload and challenges encountered in stabilizing the aircraft for landing and safely stopping within available runway length in determining the particular landing feasibility category to which a landing option should be assigned. Stated differently, engine 44 can assess the current feasibility of landing at each of the diversion airports as a function of (i) the likelihood of successfully landing at the diversion airport, and (ii) an estimated operational workload required to carry-out a successful landing at the diversion airport.

The number and type of landing feasibility categories to which the landing options can be assigned will vary amongst embodiments. However, it is generally preferred only a few landing feasibility categories are utilized for ease of comprehension. For this reason, the following will describe exemplary embodiments wherein three landing feasibilities are utilized: a HIGH FEASIBILITY landing category, a MODERATE or MID FEASIBILITY landing category, and a NO or LOW FEASIBILITY landing category. As noted above, each landing option (e.g., the designated airport and the in-range diversion airports) can be assigned to a particular landing category based upon any number of criteria including current operating conditions, runway conditions, and pilot/flight crew workload. By way of non-limiting example, the following will describe one manner in which landing options can be assigned to these exemplary landing feasibility categories. Additionally, color-coded icons or other symbology can be produced cockpit monitor(s) 18 representative of the landing feasibility category to which each landing options is assigned. Such a three landing category hierarchy lends itself well to the widely-recognized and intuitive "GREEN-AMBER-RED" color coding scheme. Specifically, the icons or other graphics representative of the HIGH, MID, and LOW landing categories can be color coded as green, amber, and red, respectively. Additional discussion of color coding is provided below in conjunction with FIG. 3. First, however, further explanation of the manner in which the landing options (both the designated airport and nearby diversion airports) can assigned or classified in the different feasibility categories is provided.

Addressing first the HIGH FEASIBILITY (GREEN) landing category, landing options can be assigned to this category when relatively straight forward or readily executed such that a relatively light operational workload is placed on the pilot and flight crew. More specifically, diversion assessment engine 44 (FIG. 2) or, more generally, controller 14 of cockpit display system 10 (FIG. 1) may assign a particular landing option to the HIGH FEASIBILITY landing category when the aircraft can converge to an ideal descent path well-before the final landing gate. For example, a landing option may be assigned to the HIGH FEASIBILITY landing category only when a predetermined threshold or buffer (e.g., 3 nautical miles) is exceeded between the point at which the aircraft is predicted to reach stabilization and the final landing gate. Furthermore, a landing option is ideally assigned to the HIGH FEASIBILITY landing category when significant changes are not required in aircraft configuration or automation parameters (e.g., vertical speed) and/or when only traditional drag components (e.g., airbrakes and flaps) are required to dissipate the excess energy of the aircraft during the landing procedure.

When a landing option is feasible, but imposes a moderate operational workload on the pilot/flight crew, the landing option may be assigned to the MID FEASIBILITY (AMBER) landing category. Assignment to the MID FEASIBILITY landing category may be appropriate if significant energy dissipation is required to stabilize the aircraft at the final landing gate. In this case, it may be required to deploy landing gear (a non-conventional drag component) along with conventional drag components during the landing procedure. A moderate workload may thus be placed on the pilot to converge to the ideal descent path during landing. Thus, by visually conveying to the pilot that a landing option has been assigned to or classified in the MID FEASIBILITY landing category, the pilot is cued to observe caution when either the designated airport is assigned to this category or when the pilot is considering finalizing a decision to reroute to a diversion airport assigned to this category. Finally, if diversion assessment engine 44 (FIG. 2) or, more generally, controller 14 of cockpit display system 10 (FIG. 1) determines that the aircraft will likely not reach adequate stabilization prior to landing, is likely incapable of converging to an ideal descent path (e.g. an approach path calculated by controller 14 or other onboard system, as described below), or will likely overshoot runway even when all conventional and unconventional drag devices are applied, the landing option may be assigned to the LOW FEASIBILITY (RED) landing category. The foregoing example notwithstanding, it is emphasized that the particular manner in which controller 14 assigns the landing options to the feasibility categories will vary amongst embodiments.

After performing the evaluation described above, diversion assessment engine 44 outputs the results to assessment response planner 46 (FIG. 2). Assessment response planner 46 enables a pilot to select a landing option, such as a diversion airport, for further evaluation. In this manner, planner 46 allows a pilot to narrow down and select among the candidate diversion airports when determining whether a diversion is warranted and, if so, the alternative airport to which the aircraft can be safely rerouted. The additional operational details provided by planner 46 may include vertical trajectory and projections regarding the intersect point between the aircraft trajectory and an ideal descent path for a particular runway at a diversion airport, as described more fully below in conjunction with FIGS. 7-11. Planner 46 may also consider the associated drag components deployment plan and fully or semi-automated vertical guidance possibilities. The feasibility and safety assessments are preferably performed progressively to reflect the relevance to most recent weather, runway, fuel, and aircraft health conditions. Finally, output engine 48 provides an output signal to cockpit monitor(s) 18 to produce one or more navigation displays thereon, as further described below. If desired, engine 48 can also automatically transmit the feasibility and safety assessment to ATC 34 (FIG. 1), which may be displayed on ATC display 36 (FIG. 1) in a textual or graphical format. This can facilitate negotiations between the pilot and ATC 34 (FIG. 1) regarding diversion of the aircraft as described below in conjunction with FIG. 12.

By performing the above-described process, controller 14 and, more generally, cockpit control system 10 can assess the current feasibility of landing at one or more landing options (including a number of diversion airports) in range of the aircraft and assign each landing option to one of a plurality of predetermined landing feasibility categories. In keeping with the foregoing example, these landing feasibility categories can include HIGH FEASIBILITY, MID FEA- SIBILITY, and LOW FEASIBILITY landing categories. After assigning each diversion airport to a landing feasibility category controller 14 can generate one or more navigation display on cockpit monitor(s) 18 visually conveying to the pilot the available landing options, the feasibility of the available landing options, and other information useful in assessing and executing a landing diversion. It is preferred that certain unique and readily-comprehendible symbology is utilized represent the feasibility category assigned to the landing options. This symbology will inevitably vary amongst embodiments and can be any graphical symbol that quickly and intuitively conveys to a pilot the feasibility category. In a preferred embodiment, color coded icons are utilized to represent the feasibility categories, such as the color coded icons described below in conjunction with FIG. 3.

By way of non-limiting example, FIG. 3 sets-forth a table including three icons that can be utilized to visually denote the HIGH (GREEN), MID (AMBER), and LOW (RED) landing categories. Additionally, the right column of table shown in FIG. 3 provides a key correlating the illustrated cross-hatching patterns (which are utilized for patent illustration purposes) with corresponding color codes. In particular, as indicated in FIG. 3, the icon representatives of the HIGH, MID, and LOW FEASIBILITY categories may be color coded green, amber, and red, respectively, in actual implementations of the navigation displays. Examples of navigation displays that may be generated by cockpit display system 10 will now be described in conjunction with FIGS. 4-11 wherein cross-hatching is utilized to denote the color codes identified in FIG. 3.

Figure 4:
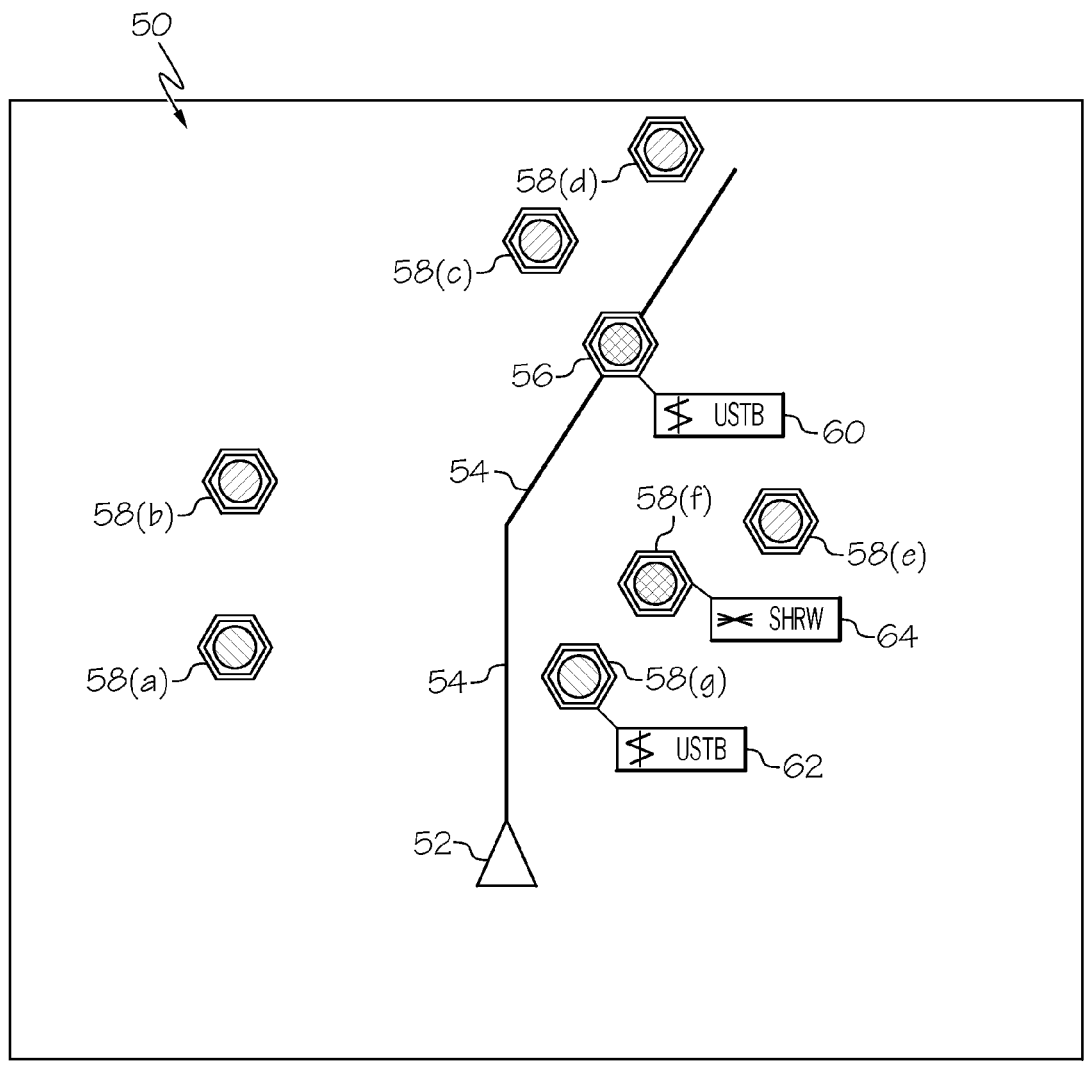
FIGS. 4-6 are screenshots of a top-down or horizontal navigation display, which can be generated by the cockpit display system shown in FIG. 1 and which illustrate several different landing scenarios.

FIG. 4 illustrates a HNAV display 50 that may be generated by controller 14 (FIG. 1) on one of cockpit monitors 18 in accordance with a first exemplary scenario. Display 50 includes an ownship symbol 52 and a number of line segments 54, which collectively represent a leg of the aircraft's planned flight route encompassing approach and landing. The planned route intersects or terminates at designated airport icon 56, which represents the airport at which the ownship aircraft is scheduled to land. HNAV display 50 is further generated to include a number of diversion airport icons 58(a)-(g), which represent diversion airports in range of the aircraft. The positioning of designated airport icon 56 and diversion airport icons 58(a)-(g) on display 50 denote the real-world location of the designated airport and the diversion airports relative to the aircraft position. Additionally, icons 56 and 58(a)-(g) are color coded in accordance with their assigned landing feasibility categories. In this scenario, controller 14 (FIG. 1) has assigned the designated airport to the LOW FEASIBILITY (RED) landing category. Thus, designated airport icon 56 is color coded red (again, represented by a first cross-hatching pattern, as indicated in FIG. 3). Similarly, diversion airport icon 58(f) has also been assigned to the LOW FEASIBILITY landing category and is likewise color coded red. In contrast, diversion airport icons 58(a) and 58(g) have been assigned to the MID FEASIBILITY landing category and are color coded amber. Finally, diversion airport icons 58(b)-(e) have been assigned to the HIGH FEASIBILITY landing category and are color coded green.

If desired, additional information can also be presented on display 50 to further visually convey the primary reason underlying the assignment of the designated airport or diversion airport to a particular landing category. In preferred embodiments, this additional information is presented on display 50 for airports that are classified in the LOW FEASIBILITY (RED) category and, possibly, airports classified in the MID FEASIBILITY (AMBER) category. This additional information can be presented as text and/or symbology, such as an intuitive reasoning icon. As a first example, a first symbol and the abbreviated text "USTB" can be produced adjacent those airports at which the feasibility category has been down graded due to an unstable approach. See designated airport icon 56 and diversion airport icon 58(g) in FIG. 4. As a second example, a second symbology and the abbreviated text "SHRW" can be produced adjacent those airports at which the feasibility category has been down graded due to an insufficient usable runway length. See the airport represented by diversion airport icon 58(f) in FIG. 4. Other primary reasons that may be displayed adjacent airports classified in MID or LOW FEASIBILITY categories include low fuel conditions or runway overshoot.

It should thus be appreciated that, by glancing at navigation display 50 (FIG. 4), a pilot can quickly gain a comprehensive mental picture of the current diversion conditions; that is, the urgency in diverting from a planned landing, as well as alternative airports in range of the aircraft presenting viable candidates at which the aircraft can safely land. The color coded "landing feasibility" icons consequently provide an intuitive situational awareness (SA) tool for the pilot to render a GO or NO GO decision for a planned airport. Additionally, HNAV display 50 is preferably updated at an appropriate refresh rate to reflect new feasibility and safety conditions with changing aircraft location and other developing conditions, such as changing runway surface conditions, changing weather conditions, developing conditions relating to emergency situations, and the like. This may be more fully appreciated by referring to FIG. 5, which illustrates display 50 under a second scenario occurring shortly after the first scenario illustrated in FIG. 4. Here, the aircraft position has changed as indicated by aircraft icon 52 and so too have the landing feasibility category assignments of the airports corresponding to icons 58(a) and 58(g). Thus, by periodically updating display 50, HNAV display 50 can convey to a pilot the current status of dynamically changing conditions affecting diversion decisions thereby alleviating the workload of the pilot and other flight crew in constantly monitoring individual parameters for further developments.

Figure 6:
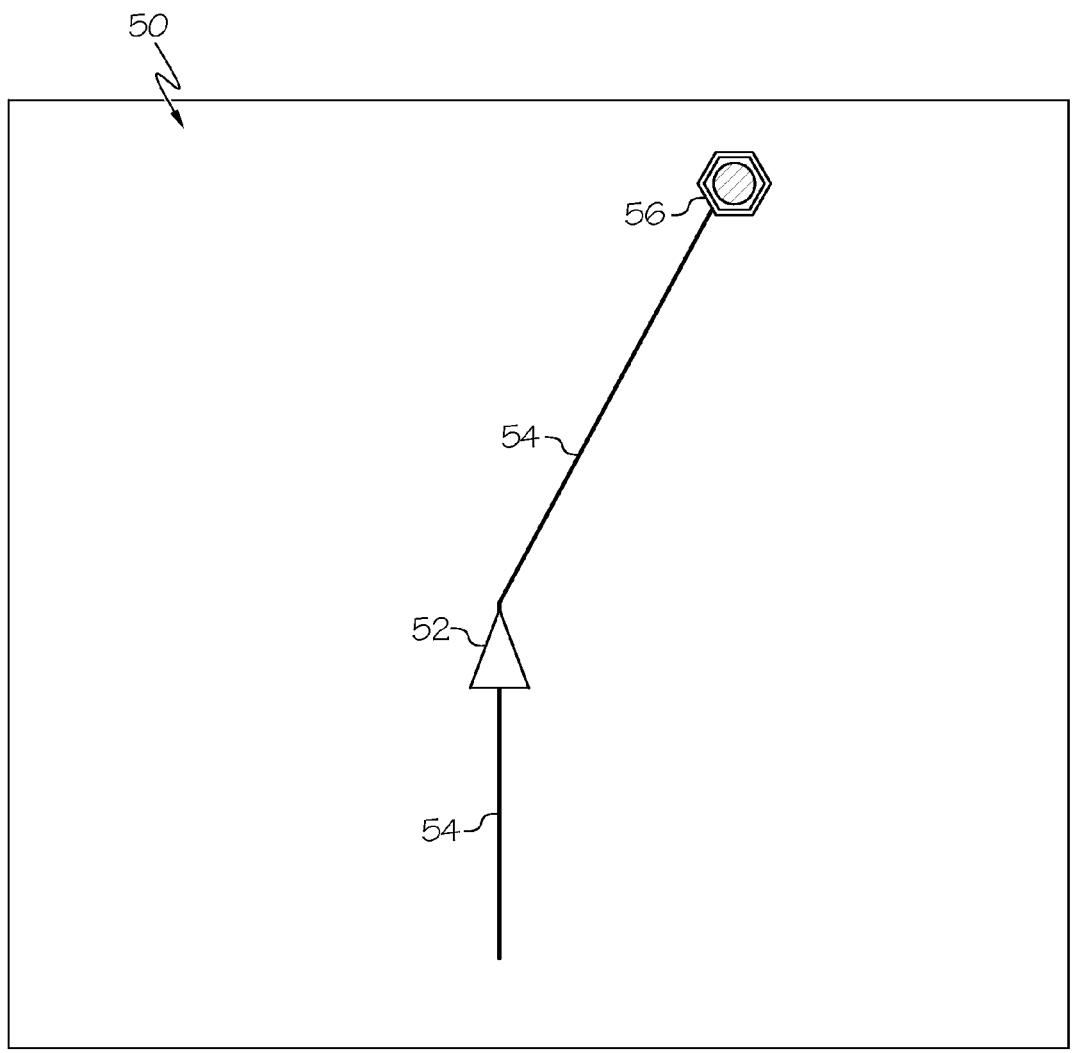

It is, of course, preferred to display only pertinent information when generating HNAV display 50 to reduce display clutter and to minimize the operational workload of the pilot and flight crew. Thus, in preferred embodiments, controller 14 (FIG. 1) is configured to suppress display of the diversion airport icons when it is determined that a diversion assessment need not be performed, as may be the case when the designated airport is assigned to the HIGH FEASIBILITY landing category. Such a scenario is illustrated in FIG. 6 wherein designated airport icon 56 is color coded green and display of diversion airport icons 58(a)-(g) (shown in FIGS. 3 and 4) is suppressed. In still further embodiments, controller 14 can suppress display of the diversion airport icons regardless of landing category to which the designated airport is assigned and until such time as controller 14 is prompted to render the diversion symbology on display 50 by, for example, a command signal received from ATC 34 via datalink subsystem 26 (FIG. 1) or from the pilot/flight crew via pilot interface 22 (FIG. 1).

Figure 5:
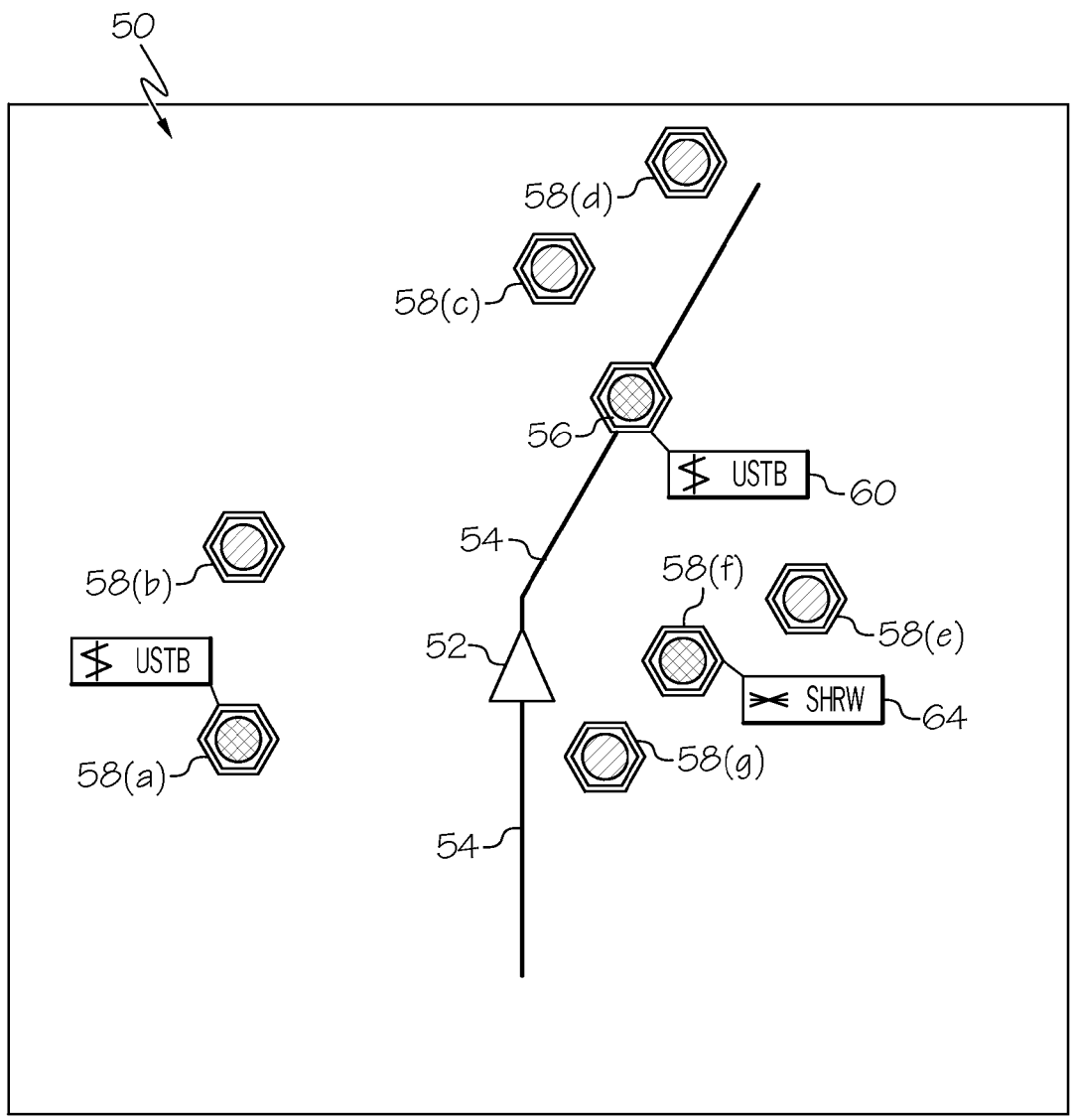

In certain embodiments, cockpit display system 10 can be configured to selectively generate a VNAV display in addition to or as an alternative to the HNAV display shown in FIGS. 4-6. The VNAV display is well-suited for visually conveying detailed information indicating the reasoning underlying the assignment of a selected diversion airport (and possibly the designated airport) to a particular landing feasibility category. Additionally, the VNAV display can provide visual cues assisting a pilot in landing at the designated airport or a diversion airport. A pilot can select a particular airport to be displayed on the VNAV display by, for example, interacting with HNAV display 50 (FIGS. 4-6) utilizing pilot interface 22 (FIG. 1); e.g., a pilot may select a particular diversion airport icon 58(*a*)-(*g*) appearing on display 50 utilizing a cursor device. In response to receipt of pilot input selecting a particular diversion airport for a more detailed landing analysis, cockpit display system 10 may generate a VNAV display of the type described below in conjunction with FIGS. 7-12. The VNAV display can be produced on the same monitor as HNAV display 50 (FIGS. 4-6) in, for example, a side-by-side or picture-in-picture format; or, instead, cockpit display system 10 may generate the VNAV display on a different monitor.

Figure 7:
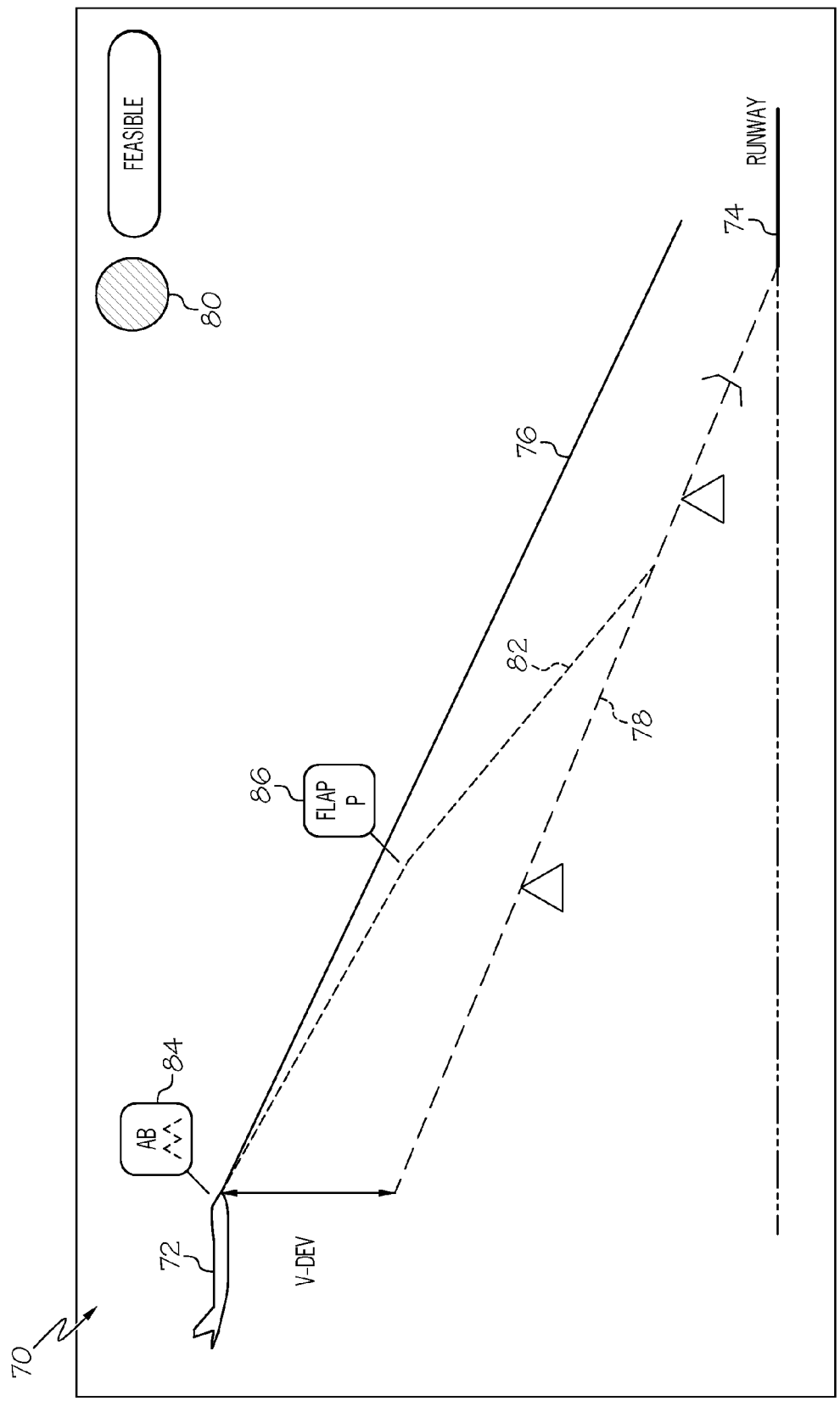
FIGS. 7-11 are screenshots of a lateral or vertical navigation displays, which may also be generated by the cockpit display system shown in FIG. 1 and which illustrate several different landing scenarios.

FIG. 7 illustrates an exemplary VNAV display 70 that can be generated by cockpit display system 10 (FIG. 1) under a further landing scenario. VNAV display 70 includes an aircraft symbol 72, a runway symbol 74, a current trajectory profile 76, and an ideal trajectory profile 78 as calculated by a controller 14 shown in FIG. 1 or another flight computer deployed onboard the aircraft. Additionally, as shown in FIG. 7, VNAV display 70 can include a predicted trajectory profile 82 and one or more drag device deployment markers or cues 84, 86, which indicate a deployment scheme that can be employed to capture the flight computer-computed ideal trajectory profile 78. In this example, the deployment cues 84, 86 include an airbrake deployment cue 84 and a first flap deployment cue 86. Finally, VNAV display 70 is generated to include an overall assessment icon and message 80, which indicates that the displayed landing option is currently classified in the HIGH FEASIBILITY (GREEN) landing category. If desired, predicted trajectory profile 82 may also be color coded green to further indicate that the landing option is presently assessed as highly feasible. In this manner, VNAV display 70 not only visually conveys the top-level assessment of the landing option, but further graphically indicates the rationale underlying the top-level assessment; here, that the aircraft can be stabilized well-ahead of the final landing gate by deployment of the aircraft drag devices in the manner shown. Thus, by viewing VNAV display 70, a pilot can obtain further operational and feasibility details for expanded SA and execution planning of a landing diversion. This can boost pilot confidence in the overall landing feasibility and safety assessment provided by cockpit display system 10 (FIG. 1) or a planned airport or diversion option.

Figure 8:
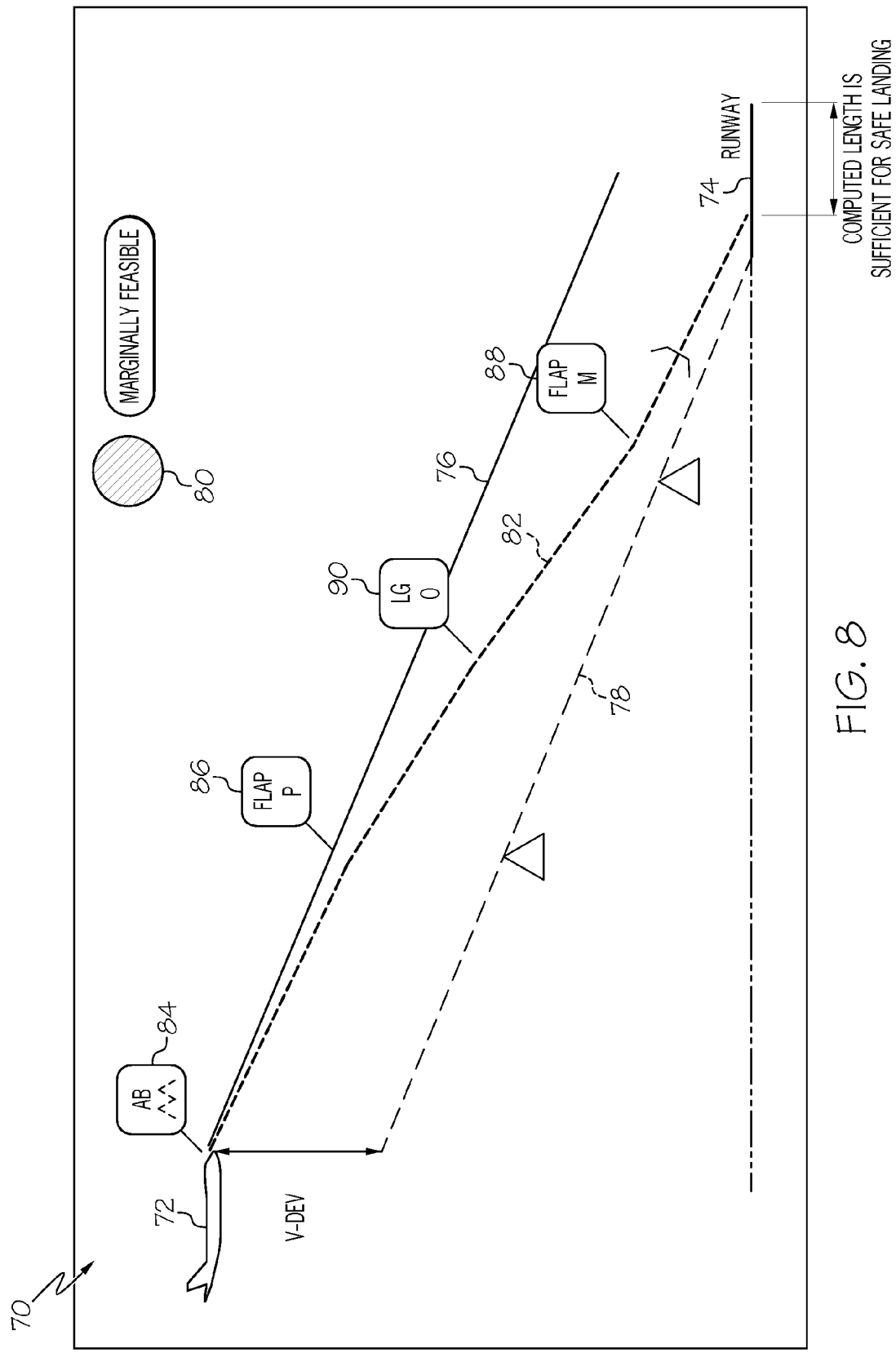

FIG. 8 illustrates VNAV display 70 under additional landing scenario in which the depicted landing option (the designated airport or selected diversion airport) has been assigned to the MID FEASIBILITY (AMBER) landing category. Cockpit display system 10 has assessed the chosen diversion option (or the designated airport with changed landing parameters) to be moderately feasible as the aircraft is predicted to stabilize beyond the final landing gate, while the predicted touchdown point indicatives that aircraft will be able to safely stop well within the available runway. Furthermore, in this case, all of the conventional drag devices and unconventional drag devices (e.g., landing gear, flaps, airbrakes, and slat) are utilized in the prediction, as indicated by deployment cues 84, 86, 88, and 90 representative of airbrake, first flap, landing gear, and second flap deployment, respectively. If desired, predicted trajectory profile 82 may be color coded amber to further indicate that the landing option is considered moderately feasible.

Figure 9:
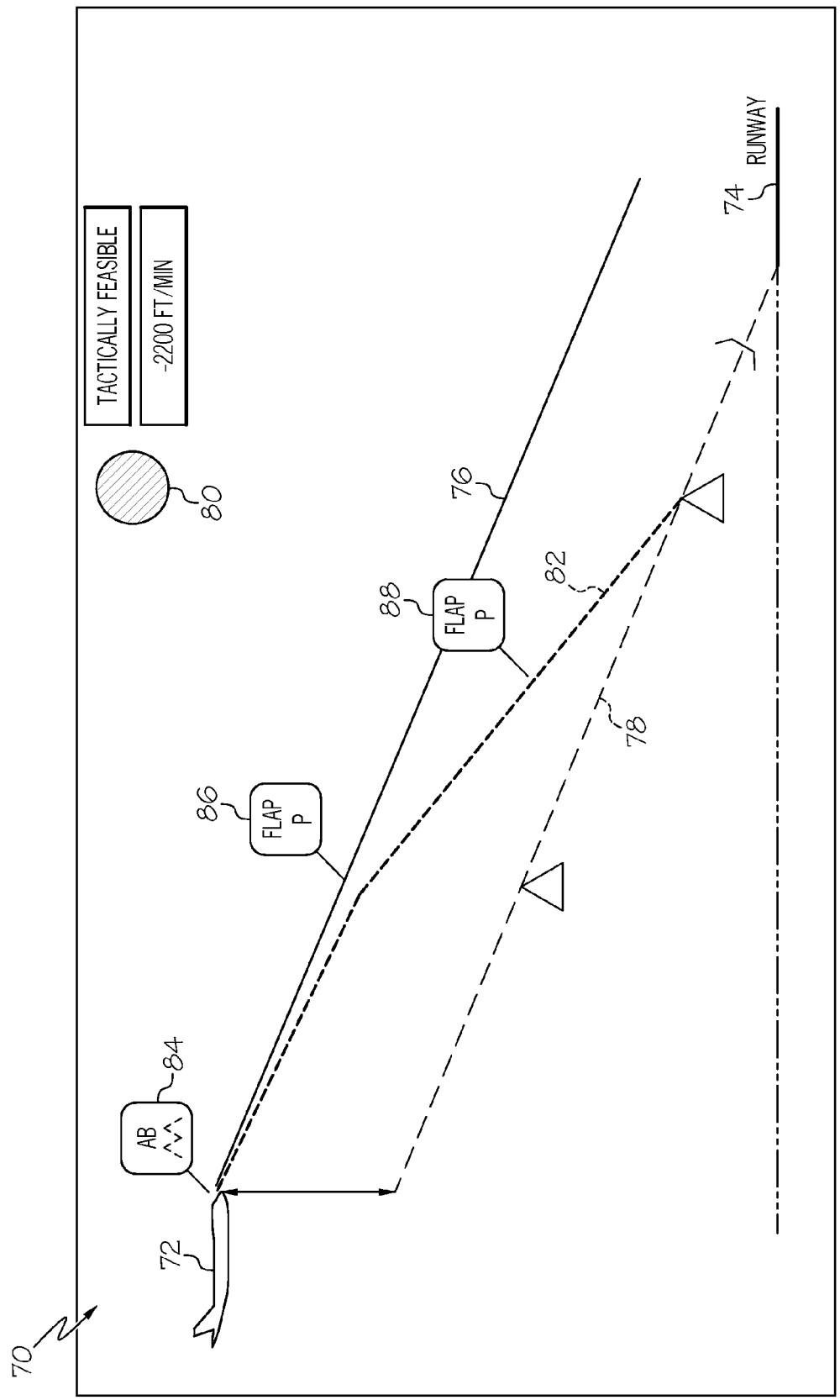
Figure 10:
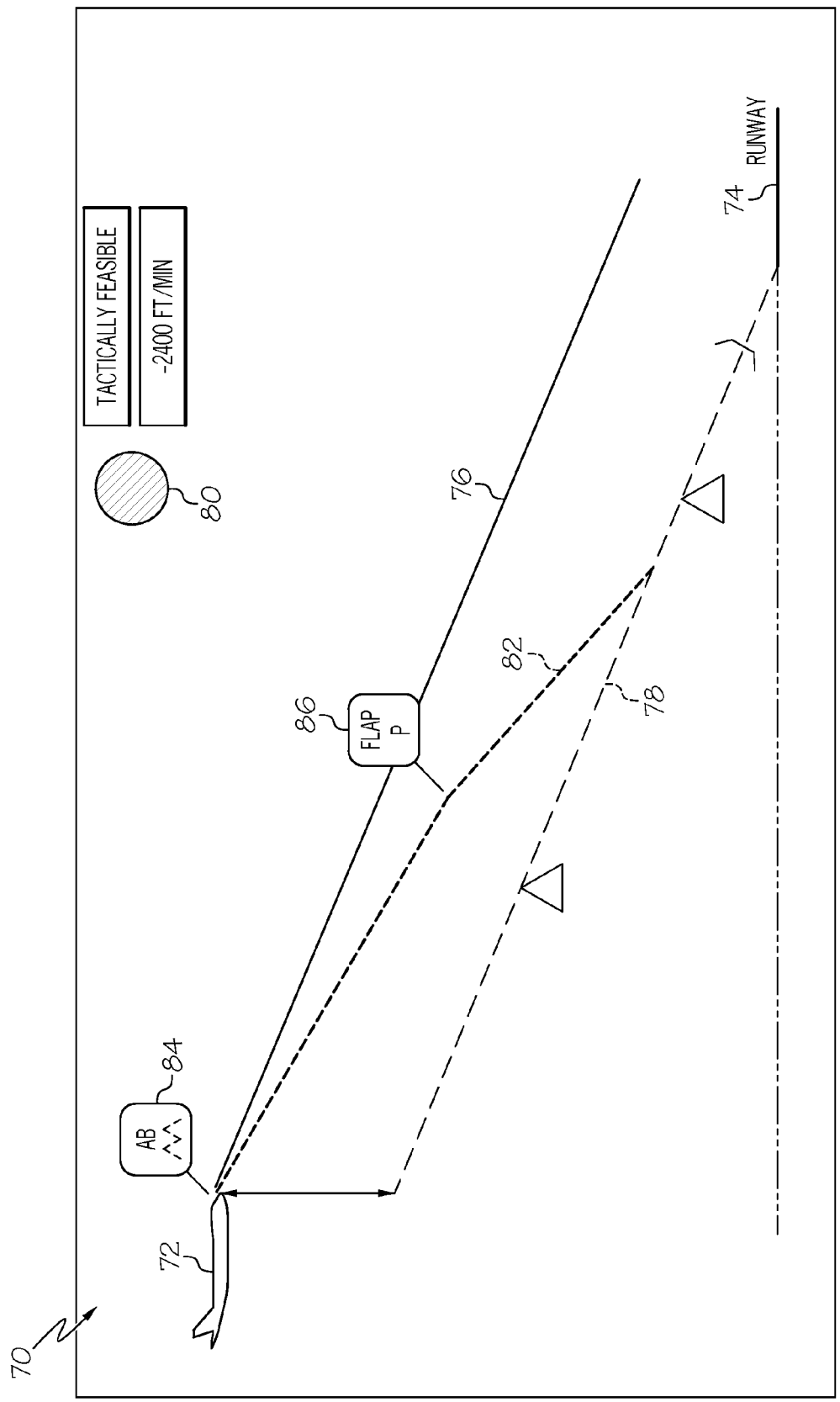

FIGS. 9 and 10 illustrate VNAV display 70 in still further landing scenarios wherein the chosen landing option has been assigned to the MID FEASIBILITY (AMBER) landing category for tactical reasons. In these scenarios, the diversion option has been determined to be tactically feasible with moderate workload, providing that the pilot commands the vertical speed of the aircraft. If desired, and as indicated in the upper right corner in FIGS. 9 and 10, cockpit display system 10 (FIG. 1) can produce display 70 to further include an ideal descent rate indicator 82. This assists piloting the aircraft in a Vertical Speed (V/S) mode with a DFO recommended descent rate and without a flight computer-guided descent. Alternatively, a pilot can utilize pilot interface 22 (FIG. 1) to manually change the descent rate and observe effect of increased descent rate on the trajectory convergence with ideal trajectory and drag devices deployment cues along the predicted trajectory. This enables a pilot to proceed with specific combination of descent rate and drag devices as per his or her confidence level and other relevant operational conditions, such as weather conditions. As was the case previously, predicted trajectory profile 82 may be color coded amber in FIGS. 9 and 10 to indicate that the landing option has been assessed to be moderately feasible by cockpit display system 10 (FIG. 1).

Figure 11:
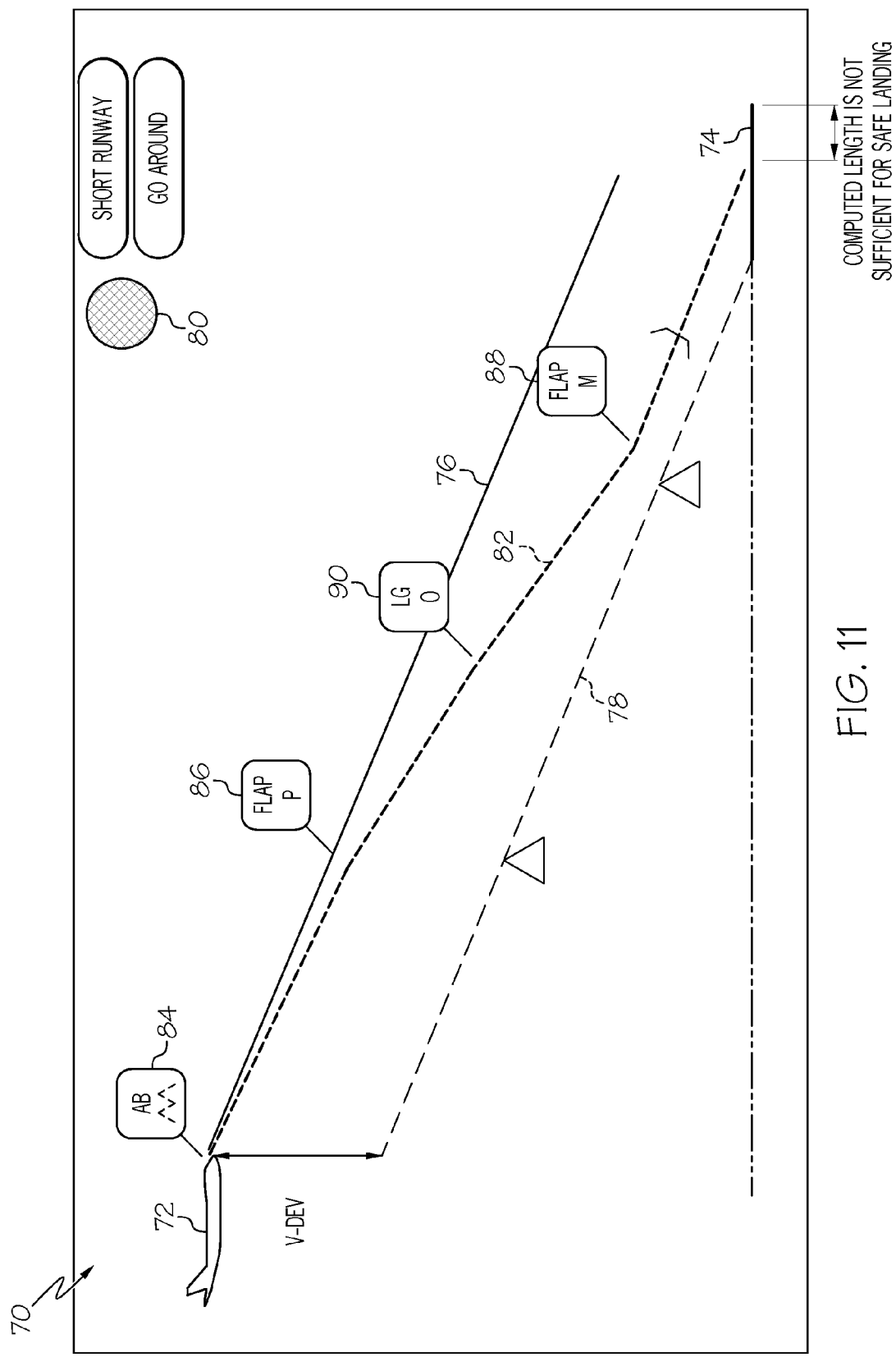

FIG. 11 illustrates VNAV display 70 under a landing scenario in which the depicted landing option has been assigned to the LOW FEASIBILITY (RED) landing category. This assignment may indicate that cockpit display system 10 has determined that is unfeasible to achieve either a stabilized landing or safe stopping at the landing option (the designated airport or the selected diversion option) without changed landing parameters. If desired, and as indicated in the upper right corner of FIG. 11, cockpit display system 10 can generate an advisory message on display 70. For example, in instances wherein the altitude of the aircraft is above a minimum altitude threshold, a "Short Runway" advisory message (shown) can be presented so that pilot can evaluate other alternate diversion options. In other scenarios wherein the altitude of the aircraft is below a minimum altitude threshold, such that a gain in altitude may be required to evaluate other diversion options, a "Go Around" advisory message may be displayed instead. Predicted trajectory profile 82 may be color coded red in such scenarios to indicate that the landing option has been assessed to be unfeasible by cockpit display system 10 (FIG. 1).

Figure 12:
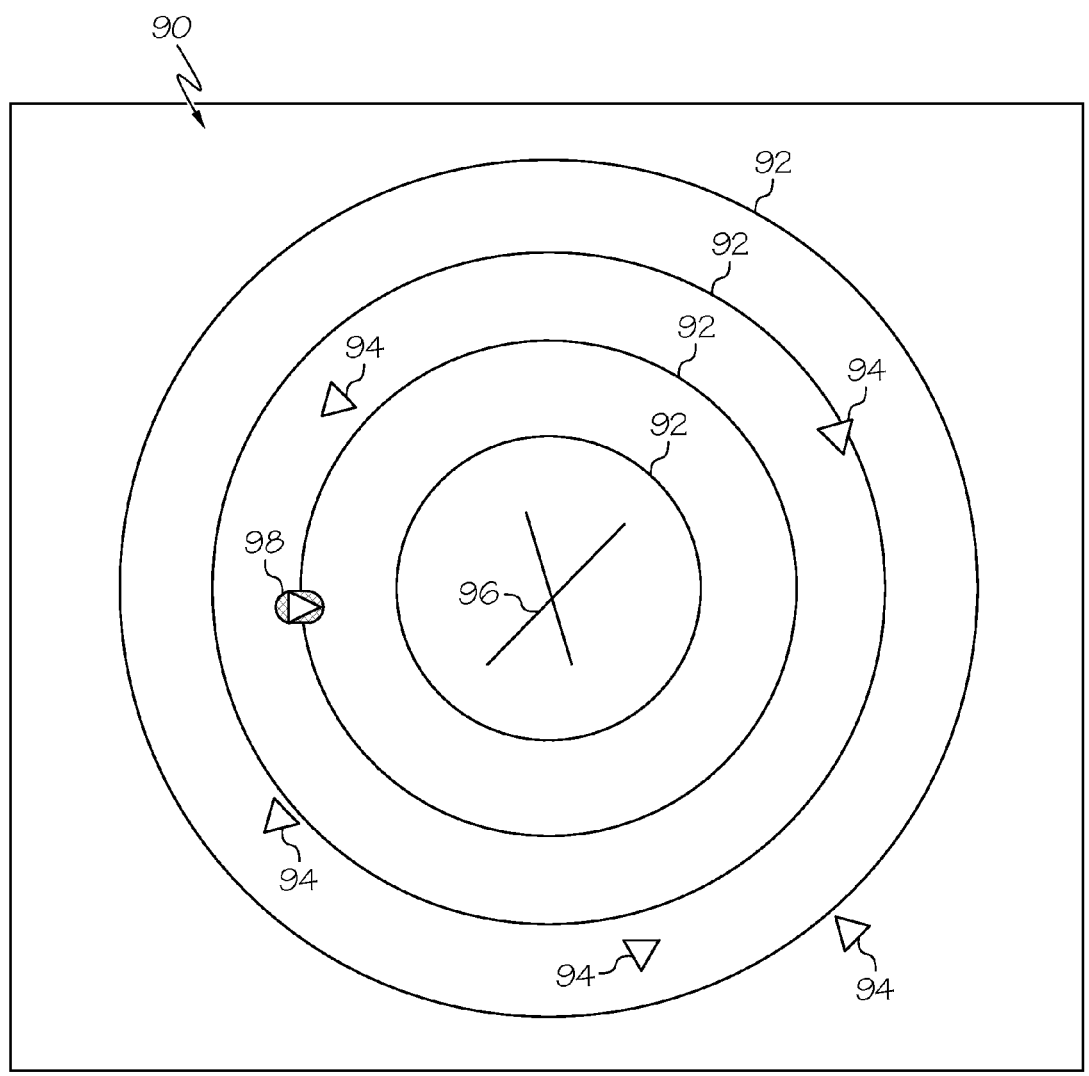
FIG. 12 is a screenshot of an Air Traffic Control (ATC) display, which can be generated by an ATC system in communication with the cockpit display system shown in FIG. 1.

In certain embodiments, cockpit display system 10 may further enable a ground controller (e.g., ATC 34 shown in FIG. 1) to view the landing category assigned to the airport at which the aircraft is currently scheduled to land. For example, as shown in FIG. 12, an ATC display 90 can be generated to included range rings 92, intruder aircraft symbols 94, tower symbol 96, and ownship aircraft symbol 98. As can be seen, ownship aircraft symbol 98 is color coded red to denote that, in this example, the ownship aircraft is scheduled to execute a landing that has been flagged as having little to no feasibility. This alerts the ATC to a potential need to assess and execute a landing diversion for the ownship aircraft. As noted above, the pilot's decisions can be communicated to ground controllers automatically through CPDLC link. The ground controllers can thus be kept informed as to whether a pilot has accepted or rejected the diversion proposed by ground controllers or if, instead, the pilot is proposing to clear for more feasible and safer options based upon diversion feasibility assessment provided by embodiments of the present invention. The overall workload involved in manual information exchanges and negotiating with ground controllers is significantly reduced as a result.

There has thus been provided cockpit display systems and methods for generating navigation displays including landing diversion symbology, which aid pilot decision-making when investigating the possibility of diverting from a planned landing. Specifically, embodiments of the above-described navigation displays provide novel decision and operational aids to facilitate rapid pilot decisions regarding the feasibility and safety of landing operations under landing diversion conditions. The proposed decision aids can be implemented based upon a temporary flight plan by considering dynamic parameters (e.g. weather, runway condition, winds, aircraft energy content, runway and airport availability, etc.) to provide landing feasibility and safety assessments with operational directions to dissipate energy. The cockpit display system continually evaluates the dynamic parameters and provides periodic assessment to make sure the relevance of its assessments. In this manner, the above-described navigation displays assist the pilot in rendering landing diversion conditions without immersing into detailed information integration and situation assessment task in the event of situations requiring diversion or change of landing parameters at the planned destination airport. As a further benefit, the cockpit display system and the above-described methods can enable a ground controller to view a pilot's situational challenges regarding assigned landing parameters. In this manner, negotiations between the pilot and the ground controller regarding landing diversions and other changes in landing parameters (e.g., Standard Terminal Arrival Routes) can be eased.

Advantageously, embodiments of the cockpit display system and the associated methods can automatically detect situations in which assessment of landing feasibility and safety is warranted, whether in response to a changed landing parameters or diversion of the flight to an alternative airport. In response to these situations, the cockpit display system can provide quick situation awareness and assessment aids for pilot to take GO or NO GO decisions by accepting or rejecting the changes in landing parameters of planned airport, as instructed by ground controller, or by selecting the most feasible and safe alternate airport during a landing diversion. The cockpit display system can provide a holistic view of available alternate airports based upon feasibility and safety evaluated with respect to various conditions, such as terminal weather, winds, available runways, respective runway length, runway conditions, fuel on board, and present energy contents of the aircraft. In preferred embodiments, the cockpit display system further visually convey the landing diversion assessment through an intuitive and widely-recognized 'GREEN-AMBER-RED' color coding scheme. An intuitive justification can be further provided by the cockpit control system for its assessments. This justification can be provided by projecting the feasibility/unfeasibility assessment on a vertical situation display where details of predicted trajectory and its divergence with ideal descent path as computed by flight computer. Additionally, as described above, drag devices deployment schedule and advisories can also be produced on the vertical situation display. Effectiveness and productivity of pilot-controller communication can also be improved by enabling controller to have a peek view of feasibility and safety assessment performed by the proposed invention. This enables the ground controller to gain an increased awareness of a pilot's workload and landing feasibility/safety of the aircraft and further enables the ground controller to assign feasible parameters in reduced communication transactions. Finally, industry standard operating procedures and guidelines involved in deployment of the drag devices can be accounted to minimize the fuel penalty.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A cockpit display system for deployment onboard an aircraft, the cockpit display system comprising:
   a cockpit monitor; and
   a controller coupled to the cockpit display system and configured to:
      assess the current feasibility of landing at a first landing option in range of the aircraft;
      assign the first landing option to one of a plurality of predetermined landing feasibility categories; and
      generate a vertical navigation display on the cockpit monitor including symbology representative of the feasibility category assigned to the first landing option;
   wherein the controller generates the vertical navigation display to further include: (i) an ideal trajectory profile for the first landing option, (ii) a predicted trajectory profile intersecting the ideal trajectory profile, and (iii) one or more visual cues marking at least one point at which a drag device of the aircraft should be deployed to follow the predicted trajectory profile to an intersection point with the ideal trajectory profile.

2. The cockpit display system of claim 1 wherein the controller is further configured to generate the predicted trajectory profile as a coded color graphic having a color indicative of the feasibility category assigned to the first landing option.

3. The cockpit display system of claim 1 wherein the symbology comprises a color coded icons, the color of the color coded icons distinguishing between the plurality of predetermined landing feasibility categories.

4. The cockpit display system of claim 3 wherein the plurality of predetermined landing feasibility categories comprise a high feasibility landing category, a moderate feasibility landing category, and a low feasibility landing category represented by a green color coded icon, an amber color coded icon, and a red color coded icon, respectively.

5. The cockpit display system of claim 1 wherein the first landing option is a designated airport at which the aircraft is scheduled to land.

6. The cockpit display system of claim 5 wherein the plurality of landing feasibility categories include a low feasibility landing category, and wherein the method further comprises:
   if the designated airport is assigned to the low feasibility landing category, generating additional symbology on the navigation display indicating the location of one or more diversion airports.

7. A method carried-out by a cockpit display system of an aircraft, the cockpit display system including a controller and a cockpit monitor operably coupled to the controller, the method comprising:
- at the controller, assessing the current feasibility of landing at a first landing option in a range of the aircraft;
- at the controller, assigning the first landing option to one of a plurality of predetermined landing feasibility categories; and
- generating a vertical navigation display on the cockpit monitor including symbology representative of the predetermined landing feasibility category assigned to the first landing option and further including graphics representing: (i) an ideal trajectory profile for the first landing option, and (ii) a predicted trajectory profile of the aircraft intersecting the ideal trajectory profile.

8. The method of claim 7 wherein generating comprises further producing, on the vertical navigation display, visual cues marking at least one point at which a drag device of the aircraft should be deployed to follow the predicted trajectory profile to an intersection point with the ideal trajectory profile.

9. The method of claim 7 further comprising:
- at the controller, assessing the current feasibility of landing at a second landing option in the range of the aircraft;
- at the controller, assigning the second landing option to one of the plurality of predetermined landing feasibility categories; and
- generating a horizontal navigation display including symbology representative of the predetermined feasibility category assigned to both the first landing option and the second landing option.

10. The method of claim 7 further comprising:
- producing a horizontal navigation display including symbology representative of the predetermined feasibility category assigned to the first landing option; and
- generating the vertical navigation display on the cockpit monitor in response to receipt of input data selecting the first landing option from the horizontal navigation display.

11. The method of claim 7 wherein the symbology comprises an icon, which is color coded in accordance with the predetermined landing feasibility category assigned to the first landing option.

12. The method of claim 7 wherein the cockpit display system further comprises a datalink subsystem coupled to the controller, and wherein the method further comprises sending data to an Air Traffic Controller via the datalink subsystem identifying the predetermined landing feasibility category assigned to the first landing option by the controller.

13. The method of claim 7 wherein assessing comprises evaluating, at the controller, an estimated operational workload required to carry-out a successful landing at the first landing option.

14. The method of claim 7 wherein generating comprises producing, on the cockpit monitor, the predicted trajectory profile to comprise a coded color graphic having a color indicative of the predetermined feasibility category assigned to the first landing option.

15. The method of claim 7 further comprising selecting the first landing option to correspond with a designated airport at which the aircraft is scheduled to land.

16. The method of claim 7 further comprising generating the graphics representative of the predicted trajectory profile in a warning color when the controller assesses the first landing option as unfeasible.

* * * * *